United States Patent Office 3,446,538
Patented May 27, 1969

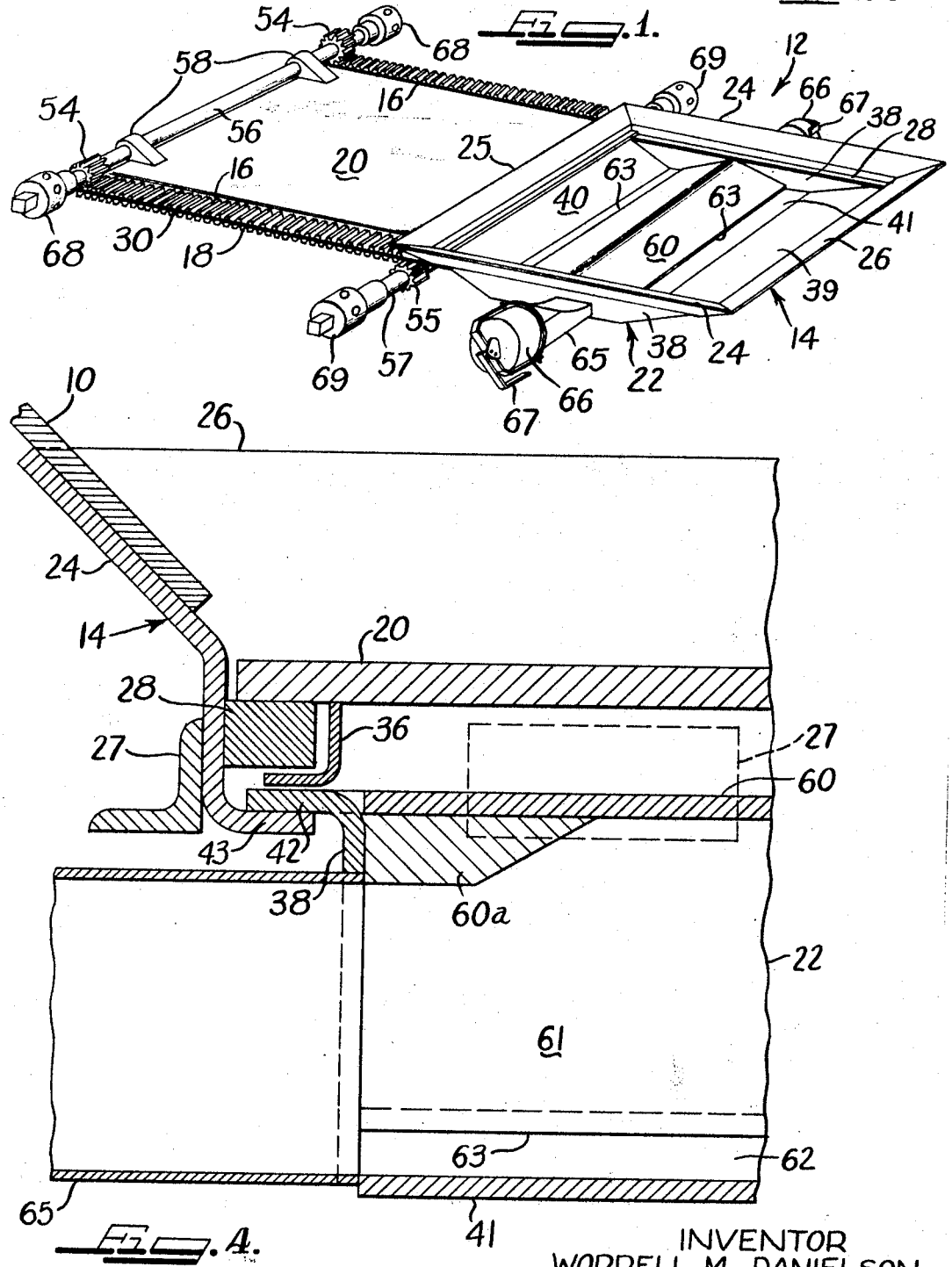

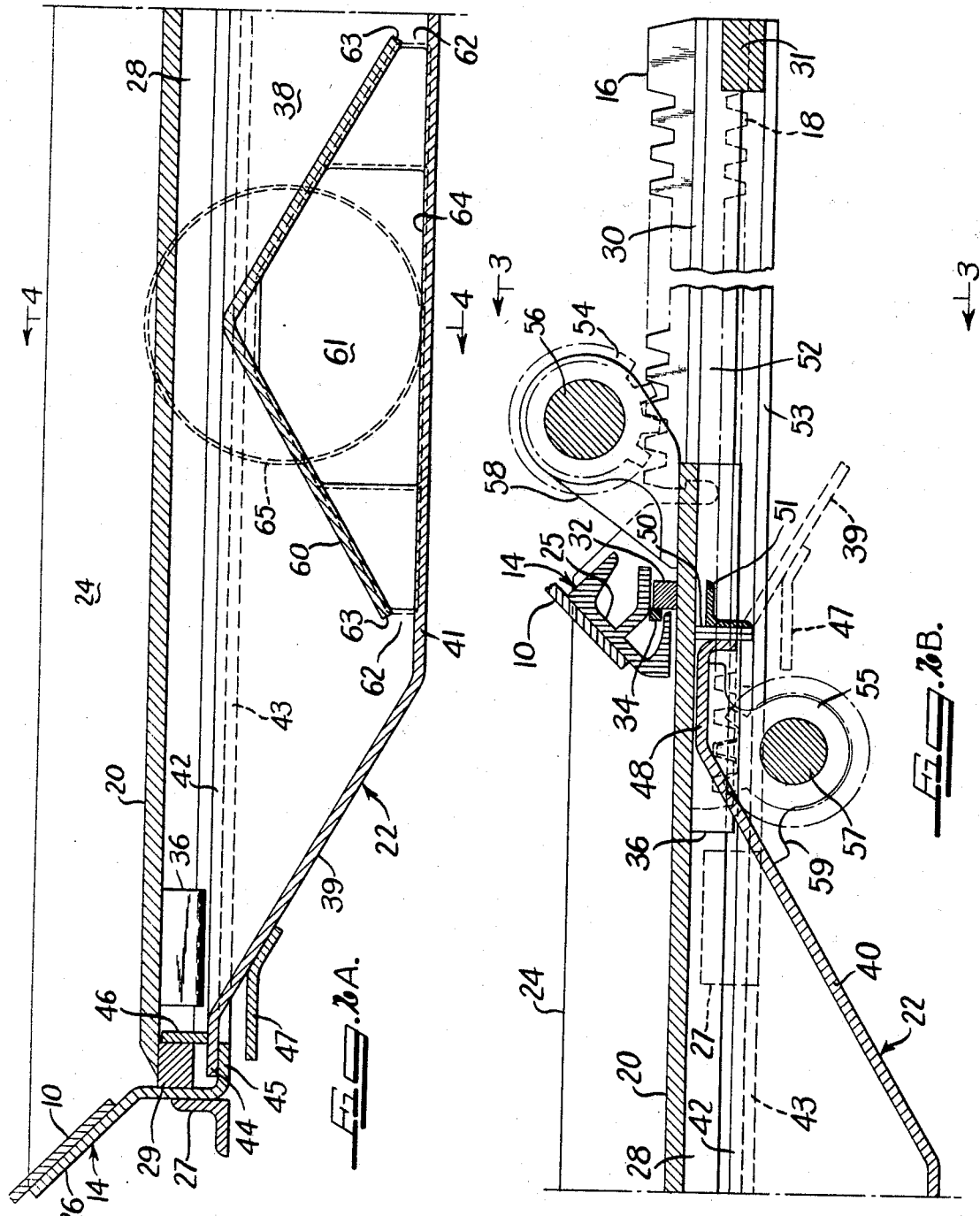

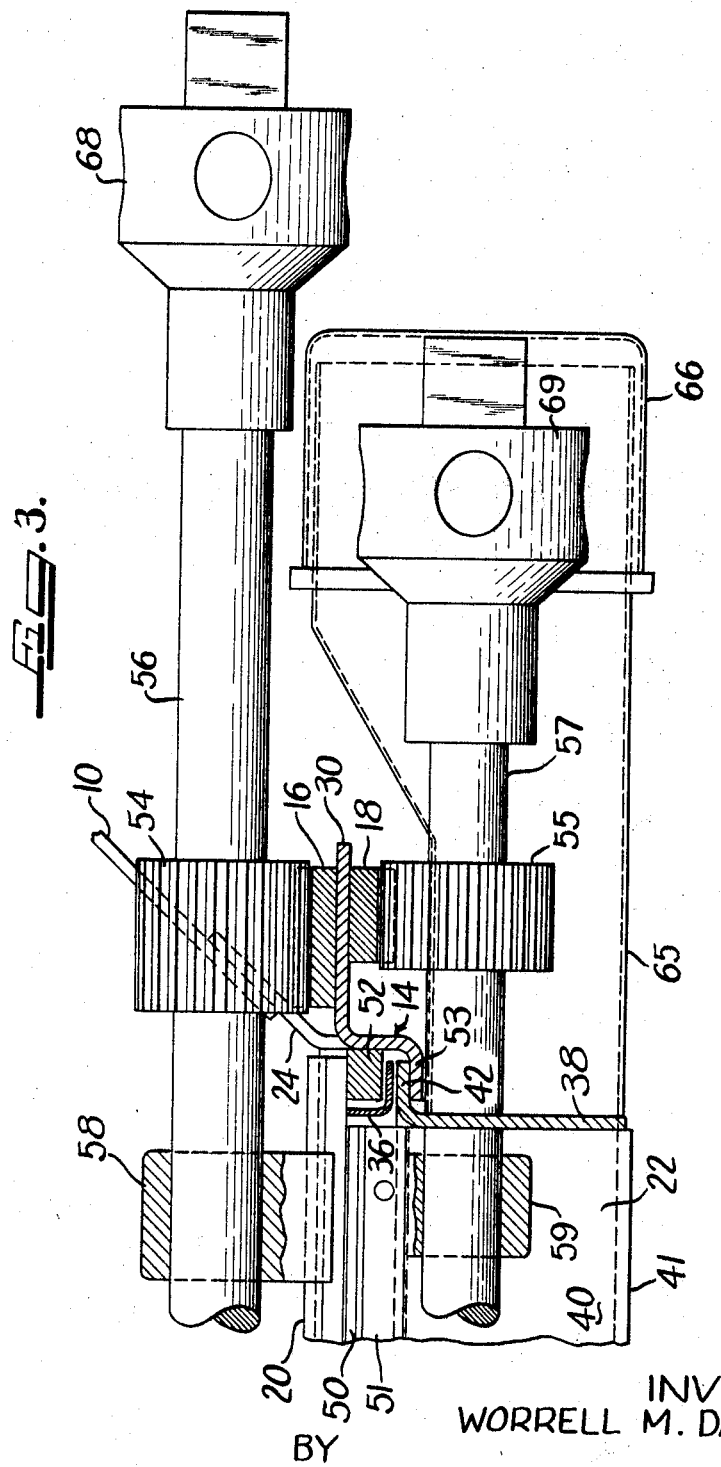

3,446,538
HOPPER DISCHARGE ARRANGEMENT
Worrell M. Danielson, Evergreen Park, Ill., assignor to Enterprise Railway Equipment Company, Chicago, Ill., a corporation of Illinois
Filed May 25, 1966, Ser. No. 552,828
Int. Cl. B65g 53/50, 3/10
U.S. Cl. 302—52                 10 Claims

ABSTRACT OF THE DISCLOSURE

A combination pneumatic and gravity hopper discharge arrangement having a vacuum chamber and a slide gate both slidably mounted on the hopper frame with the gate disposed above the vacuum chamber and independent means for selectively moving the gate and vacuum chamber to permit either pneumatic or gravity discharge of the lading in the hopper.

---

This invention relates generally to improved discharge means for hopper cars, and has particular reference to that type of hopper car wherein the discharging of lading is effected either pneumatically or by gravity.

It is common practice to use hopper cars for handling finely comminuted commodities in bulk and, although a widely accepted method of unloading is by gravity, there are certain commodities which may be unloaded more efficiently by a pneumatic system.

In order to adapt a gravity discharge car to pneumatic unloading, it is common practice to employ an attachable plenum or vaccum chamber adapted to be connected to the discharge opening beneath the gate, and same having means therein for pneumatically discharging lading. The employment of an attachable plenum chamber, however, requires the opening of the gate and exposes the lading to possible contamination due to the adherence of contaminating matter to the underside of the gate and frame adjacent the opening.

Another widely used method for selective discharge is to provide a pneumatic discharge assembly for the bottom part of the hopper above the gate which forms the bottom of the hopper. In this case, the bottom of the outlet is still exposed to road contamination. Furthermore, the cleaning of such an assembly as described above is a difficult task.

This invention provides a discharge arrangement whereby the unloading of a commodity can be selectively effected, pneumatically or by gravity, and whereby the aforementioned difficulties are eliminated. Briefly, the invention comprises a plenum or vacuum chamber for the pneumatic discharge of lading and a gate for gravity discharge, both of which are slidably mounted on the hopper bottom by means of extending runways forming part of the frame structure of the hopper bottom. The runways consist of back-to-back racks facing upwardly and downwardly. The rack teeth are engageable with pinion gears mounted on operating shafts attached one to the plenum chamber and one to the gate whereby the plenum chamber and the gate may be horizontally moved relative to the hopper bottom independently of one another.

As will be evident from the detailed description hereinafter, the above-described assembly not only provides for selective pneumatic or gravity discharge, but also serves to protect the bottom of the outlet from road contamination and permits easy access for cleaning the plenum chamber.

It is therefore an object of this invention to provide a discharge arrangement for a hopper car or the like whereby lading may be selectively unloaded by gravity through the discharge opening or pneumatically through a plenum chamber.

It is another object of this invention to provide a selective discharge arrangement for a hopper wherein either the gate or the plenum chamber may be horizontally slid away from the discharge opening for efficient unloading and cleaning.

It is another object of this invention to provide an operating mechanism for the gate and plenum chamber whereby the gate and plenum chamber may be horizontally slid away from the discharge opening.

It is another object of this invention to provide a selective discharge arrangement for a hopper car or the like wherein the plenum chamber serves as a sanitary closure to protect the bottom of the discharge outlet from road contamination.

It is another object of this invention to provide a selective discharge arrangement for a hopper wherein the plenum chamber when moved away from the discharge opening is easily accessible for cleaning same.

It is another object of this invention to provide a removable hood member in the plenum chamber as part of the conduit system for easy and efficient pneumatic unloading and for facilitating cleaning of the plenum chamber.

This invention further resides in details of construction associated with the improvement and in the means employed for carrying out the purposes of the invention.

Other objects and advantages of this invention will become apparent on examination of the following specification and claims, together with the accompanying drawings wherein:

FIG. 1 is a perspective view of the selective discharge arrangement showing the gate slid away from and the plenum chamber in position beneath the discharge opening;

FIGS. 2A and 2B together form a partially broken longitudinal central vertical section of a preferred form of the selective discharge arrangement of the present invention with both the slide gate and the plenum chamber being shown in their closed positions beneath the hopper discharge opening;

FIG. 3 is a partially broken vertical transverse section taken generally along the line 3—3 of FIG. 2B showing, in detail, the operating mechanism for the gate and plenum chamber; and FIG. 4 is a partially broken vertical transverse section taken generally along the line 4—4 of FIG. 2A.

In a conventional hopper car, the hopper 10 is comprised of inner and outer side walls which meet with oppositely sloping end walls to complete the four sides of the hopper and provide a discharge opening between the bottom edges of said walls.

The selective discharge arrangement 12 of the present invention generally comprises a novel hopper frame structure 14 which is fitted over and secured to the lower edges of the hopper defining the discharge opening by any suitable means such as welding, bolting or riveting, upper and lower racks 16 and 18 carried on laterally spaced longitudinally extending portions of the frame structure 14, a slide gate 20, and a plenum or vacuum chamber 22.

The hopper frame structure 14 comprises two side walls 24, an end wall 25, and a front wall 26. The side walls 24 and the front wall 26 are generally Z-shaped in cross-sectional configuration, as best shown in FIGS. 2A and 4, and same carry boot flanges or clips 27 secured to the outer surfaces thereof for convenient attachment of unloading boots which are necessary for completely sanitary unloading of foodsutffs or other contaminable ladings under gravity discharge conditions. The end wall 25 is generally E-shaped in cross-sectional configuration, as shown clearly in FIG. 2B. The upper parts of the walls 24, 25 and 26 of the frame structure 14 are fitted over the bottom edges of the walls of the hopper 10 and are secured thereto, as by welding, bolting or riveting.

Elongated gate supporting rail members 28 are secured to and project inwardly from the side walls 24 of the hopper fram structure 14, and same extend longitudinally along said frame structure to provide ways on which the gate 20 can slide. Similarly, a transversely extending rail member 29 is provided for supporting the front edge of the gate 20 in its closed position.

The slidable gate 20 is of a conventional form, said gate providing a flat floor for the hopper 10 and closing the discharge opening when same is in a closed position. On the underside of the gate 20 along each side edge are provided longitudinally spaced angle members 36 which extend downwardly and outwardly beneath the rails 28 (FIG. 4), same serving to hold the gate 20 down as well as providing closure strips when lading is discharged. As best shown in FIG. 2B, a transverse strip 32, attached to the top of the gate 20 at the trailing edge thereof, is adapted to engage a stop member 34, carried by the hopper frame structure 14, same acting as a stop when the gate 20 is moved into its closed position.

The plenum chamber 22 which is used for pneumatically discharging lading comprises two generally vertical side walls 38, a slanting front wall 39, an oppositely slanting end wall 40, and a generally flat bottom 41. The upper edges of the sides walls 38 are bent outwardly to form flanges 42 which, as best shown in FIGS. 3 and 4, are slidably supported on inwardly turned flange portions 43 of the Z-shaped side walls 24 of the hopper frame structure 14. The upper edge of the front wall 39 is bent forwardly to form a flange 44 which in the closed position of the plenum chamber 22, as shown in FIG. 2A, is supported on an inwardly turned flange 45 of the Z-shaped front wall 26 of the frame structure 14. The flange 44 on the front wall 39 carries an upstanding stop member 46 thereon which is adapted to engage the gate supporting rail 29 and thereby provides a stop when the plenum chamber 22 is moved under the discharge opening, as shown in FIG. 2A. The front wall 39 also carries a generally L-shaped forwardly projecting bracket 47 which is spaced below the flange 45 of the front wall 26 and is adapted to prevent the plenum chamber 22 from moving upwardly. The end wall 40 terminates in a rearwardly and downwardly turned flange 48 to which an upstanding gasket 50 is secured by an angular member 51. As illustrated in FIG. 2B, the upper edge of the gasket 50 slidably engages the underside of the slide gate 20 and serves as a seal between the plenum chamber 22 and the gate 20. The angular member 51 is adapted to engage a transverse member 31 which extends between the terminal ends of the spaced racks 18 to provide a stop when the plenum chamber 22 is moved into its limit position away from the discharge opening.

A conduit system, within the plenum chamber 22, is provided for the discharge of lading. The conduit system is in the form of a centrally disposed inverted V-shaped hood 60 which is removably supported by suitable support members 60a (FIG. 4) between the side walls 38 and above the bottom 41 whereby to define with the bottom 41 a conduit section 61 that extends transversely through the plenum chamber 22 between the side walls 38. Openings 62 are provided between the lower edges 63 of the hood 60 and the bottom 41 of the plenum chamber 22 in order to provide for passage of the lading from the upper portion of the plenum chamber 22 into the conduit section 61 at each side thereof, whereafter air of the pneumatic system will entrain the lading in a conventional manner for discharge of same from the plenum chamber. The side walls 38 are each provided with an opening 64 which communicates with the inner conduit section 61 and to which is connected a conventional external conduit section 65, the two external conduit sections having cylindrical outer ends adapted to be connected to a pneumatic system in a known manner. The cylindrical ends are provided with conventional caps 66 which are secured thereon by a known bale and locking cam arrangement 67 whereby to seal the plenum chamber 22 when same is not in use.

The frame structure 14 is characterized by a pair of transversely spaced longitudinal extensions 30 of the side walls 24 which are flanged horizontally outwardly with the racks 16 and 18 being secured on the upper and lower faces thereof, respectively, as best shown in FIG. 3. The extensions 30 are spaced at one end by the transverse member 31 and at the other end by the end wall 25 of the frame structure 14. As shown in FIG. 3, the longitudinal members or extensions 30 are generally Z-shaped in configuration and same carry longitudinal extensions 52 of the inwardly projecting gate supporting rails 28 thereon. The bottom flanges 53, which are extensions of the flanges 43, are adapted to slidably support the flanged upper edge 42 of the plenum chamber 22 when same is moved away from the discharge opening. The longitudinal members 30 also carry the upwardly facing top racks 16 and the downwardly facing bottom racks 18 which may be secured thereto by any suitable means.

The above-described gate 20 and plenum chamber 22 are selectively movable longitudinally along the bottom of a car by means of sets of pinion gears 54 and 55, respectively, which are adapted to engage the racks 16 and 18, respectively. The pinion gears 54 are rigidly attached to a shaft 56 which is rotatably mounted on the trailing edge of the gate 20 by means of brackets 58. The pinion gears 55 are attached in a similar manner to a shaft 57 which is rotatably mounted on the end wall 40 of the plenum chamber 22 by means of brackets 59. To effect selective rotation of the shafts 56 and 57, there are provided conventional operating heads 68 and 69 secured to both ends of each of said shafts, said operating heads being adapted to receive an operating bar, not shown.

The operation of the above-described selective discharge arrangement is as follows:

Assuming that the gate 20 and the plenum chamber 22 are both in their closed positions, directly below the discharge opening, and pneumatic discharge is desired, the gate 20 is simply slid longitudianlly along the bottom of the car away from the discharge opening, by means of the pinions 54 and the racks 16, until said gate rests on the gate supporting extensions 52 carried by the frame members 30, as shown in FIG. 1. The lading is thus free to enter the plenum chamber 22, by means of gravity, and to be discharged therefrom through the conduit system in a conventional manner.

For gravity discharge, the plenum chamber 22 is slid away from the discharge opening, by means of the pinions 55 and the racks 18, until said plenum chamber rests on the supporting flange extensions 53 on the frame members 30. The gate 20 is then slidably moved away from the discharge opening, as described above, allowing the lading to be gravity discharged in a conventional manner.

It is evident, from the foregoing description, that when the gate 20 and the plenum chamber 22 are in their closed positions with the plenum chamber 22 being disposed below said gate, the plenum chamber serves as a sanitary closure to protect the bottom of the outlet from road contamination. It is also evident that the gate 20 can be used to control or shut off flow to the plenum chamber 22 at any point where this might be desired during the pneumatic discharge of lading.

When the gate 20 is closed, the plenum chamber 22 may be pneumatically cleaned. To render the plenum chamber 22 more accessible for a complete cleaning, same is moved into its position away from the discharge opening and its hood 60 is removed, the slide gate 20 being in its closed position.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A hopper discharge arrangement for a hopper having a discharge opening, said arrangement comprising:
   (a) a frame structure disposed about said discharge opening;
   (b) an open-top vacuum chamber having downwardly converging end walls and generally vertical side walls with pneumatic inlet and outlet ports provided therein slidably mounted on said frame structure for sliding movement between a first pneumatic discharge position beneath said discharge opening and a second position away from said discharge opening;
   (c) means for slidably moving said vacuum chamber between said first and second positions;
   (d) a gate slidably mounted on said frame structure immediately above said vacuum chamber for sliding movement between a first hopper-closing position beneath said discharge opening and a second position away from said discharge opening and on the same side thereof as said second position of said vacuum chamber; and
   (e) means for slidably moving said gate between said first and second positions.

2. A hopper discharge arrangement as recited in claim 1 wherein an inverted V-shaped hood is removably mounted in said vacuum chamber with said hood extending between said generally vertical side walls.

3. A hopper discharge arrangement as recited in claim 1 wherein gravity discharge of the hopper is achieved upon first slidably moving said vacuum chamber into its second position and then slidably moving said gate in the same direction into its second position and wherein pneumatic discharge is achieved by slidably moving said gate into its second position while said vacuum chamber is disposed in its first position.

4. A hopper discharge arrangement as recited in claim 1 wherein said frame structure is characterized by side members which are disposed parallel to the direction of sliding movement of said gate and vacuum chamber and which have extensions projecting away from said discharge opening in one direction only, said side members and said extensions thereof having means thereon for slidably supporting said gate and said vaccum chamber in both their first and second positions.

5. A hopper discharge arrangement as recited in claim 4 wherein said side member extensions of said frame structure are provided on both their upper and lower surfaces with rack formations, wherein a first operating shaft is rotatably mounted on the trailing end of said gate above said side member extensions and has a pair of pinion gears mounted thereon in meshed engagement with said rack formations provided on the upper surfaces of said side member extensions, and wherein a second operating shaft is rotatably mounted on the trailing end of said vacuum chamber beneath said side member extensions and has a pair of pinion gears mounted thereon in meshed engagement with said rack formations provided on the lower surfaces of said side member extensions.

6. A hopper discharge arrangement as recited in claim 5 wherein operating heads are provided on both ends of each of said first and second operating shafts whereby said gate and said vacuum chamber can be selectively slidably moved between their first and second positions from either side of the hopper.

7. A hopper discharge arrangement for a hopper having a discharge opening, said arrangement comprising:
   (a) a frame structure disposed about said discharge opening and characterized by a pair of side members having extensions projecting in one direction away from said discharge opening in parallel relationship;
   (b) a gate slidably supported on said side members and said extensions thereof for movement between a first hopper-closing position beneath said discharge opening and a second position away from said discharge opening;
   (c) an open-top vacuum chamber having pneumatic inlet and outlet ports provided therein slidably supported on said side members and said extensions thereof immediately below said gate for movement between a first position beneath said discharge opening and a second position away from said discharge opening and on the same side thereof as said second position of said gate; and
   (d) means for selectively moving said gate and said vacuum chamber between their first and second positions whereby when said vacuum chamber is moved into its second away position and said gate is then moved into its second away position gravity discharge of the hopper is achieved and whereby when said gate is moved into its second away position while said vacuum chamber is disposed in its first position beneath the discharge opening the hopper may be emptied pneumatically.

8. A hopper discharge arrangement as recited in claim 7 wherein rack formations are provided on both the upper and lower surfaces of said side member extensions, wherein a first operating shaft is rotatably mounted on the trailing end of said gate above said side member extensions and has a pair of pinion gears mounted thereon in meshed engagement with said rack formations provided on the upper surfaces of said side member extensions, wherein a second operating shaft is rotatably mounted on the trailing end of said vacuum chamber beneath said side member extensions and has a pair of pinion gears mounted thereon in meshed engagement with said rack formations provided on the lower surfaces of said side member extensions, and wherein operating heads are provided on both ends of each of said first and second operating shafts whereby said gate and said vacuum chamber can be selectively slidably moved between their first and second positions from either side of the hopper.

9. A hopper discharge arrangement as recited in claim 8 wherein said gate is provided on each side thereof with at least one hold-down member, which hold-down members are engageable with said side member extensions to prevent upward movement of said gate.

10. A hopper discharge arrangement as recited in claim 7 wherein an inverted V-shaped hood is removably mounted in said vacuum chamber, said hood being removable to facilitate cleaning of said vacuum chamber when said vacuum chamber is in its second away position and said gate is in its first hopper closing position.

References Cited

UNITED STATES PATENTS

| | | | |
|---|---|---|---|
| 3,348,501 | 10/1967 | Stevens et al. | 105—248 |
| 3,360,302 | 12/1967 | Bagguley | 302—52 |
| 3,138,117 | 6/1964 | Dorey | 302—52 X |
| 3,220,778 | 11/1965 | Aller | 302—52 |
| 3,316,030 | 4/1967 | Kemp | 302—52 |

ANDRES H. NIELSEN, *Primary Examiner.*